H. P. GERRISH.
Corn Husker.
No. 16,008.
Patented Nov. 4, 1856.
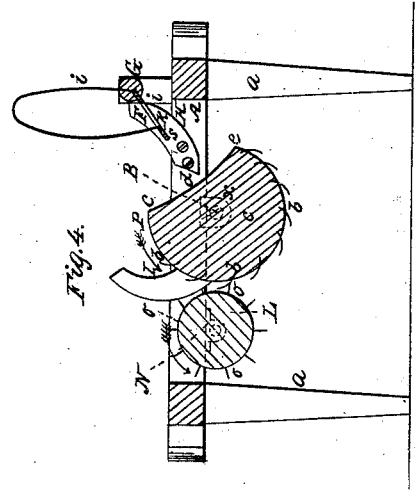
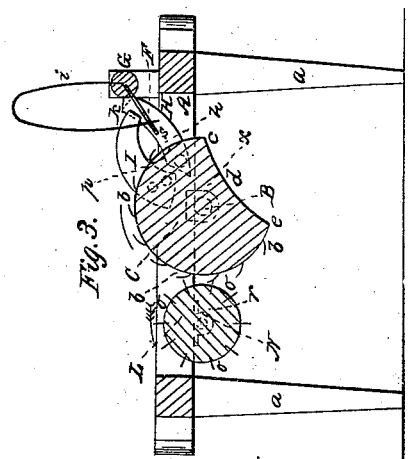
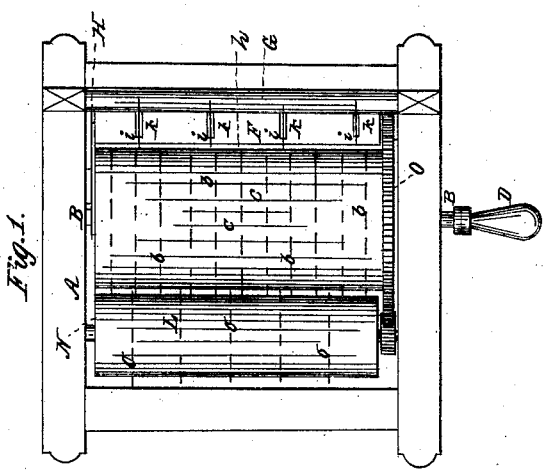
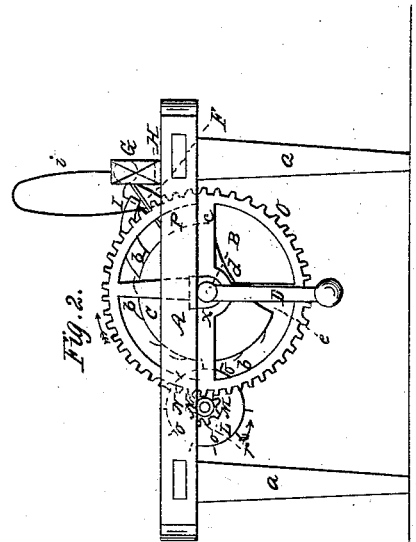

UNITED STATES PATENT OFFICE.

HARLAN P. GERRISH, OF BOSCAWEN, NEW HAMPSHIRE.

MACHINE FOR HUSKING CORN.

Specification of Letters Patent No. 16,008, dated November 4, 1856.

*To all whom it may concern:*

Be it known that I, HARLAN P. GERRISH, of Boscawen, in the county of Merrimack and State of New Hampshire, have invented a new and useful Machine for Husking Corn; and I do hereby declare that the following specification, taken in connection with the accompanying drawings, fully describes the nature and operation of the said machine.

Figure 1, of the above mentioned drawings, represents a top view of my machine. Fig. 2, shows a side view, and Fig. 3, a transverse vertical section of it.

A, in the drawings denotes the frame of the machine, supported upon suitable legs or standards *a, a*. A large cylinder C, extends across the machine, and is supported on a shaft B, made to revolve in suitable bearings *x, x*, attached to the frame A, said shaft and cylinder having a rotary motion applied to them by a crank D, in the direction denoted by arrows, all as seen in the drawings. This cylinder (which I call the husking cylinder) has inserted or placed upon its surface a series of hooked pins *b, b*, they being of similar size, and having their hooks or points turned in the direction seen in Figs. 2 and 3.

F denotes an inclined rest plate, projecting from a bar G, placed over the front end of the frame A. This stop plate extends from the bar in a direction toward the husking cylinder, and so that as the cylinder is revolved there shall be a small space *h* left between its lower edge, and the path of the hook upon the cylinder. Four or any other suitable number of springs *i, i*, extend up from the bar G, and then down through slots *k, k*, made through the plate F. A portion of the surface of the cylinder is cut away, as seen in Fig. 3, and so as to leave a depression *c d e*, along the whole length of the cylinder.

The ear of corn to be husked is placed upon the inclined plate E, and is borne down against a part *p*, of the husking cylinder, next adjacent to the point *c*, of the depression *c d e*. This portion of the cylinder is left plain, or free from hooks, and when the ear is placed upon the plate E, the cylinder is to be in a position to allow the ear to be borne down against this plane surface by the springs *i, i*. Under these circumstances when the rotary motion is next given to the cylinder, the points of the hooks will be brought into contact with the husks on the ear, they projecting only far enough to catch into the husks without injuring the corn, and the space *h*, before spoken of, being too small to allow the ear to drop through it. Now as the cylinder is further revolved, the hooks tear the husks from the adjacent side of the ear, and as they descend they turn the ear around, so that the next series or row of hooks catch into the next portion of the husks, and so on until the cylinder has been revolved far enough to bring the point *e*, of the depression *c d e*, opposite to the edge of the stop plate F, when it will be found that the ear has been entirely freed from its husks.

Now when the cylinder is revolved a little further, (when the depression comes opposite to the points of the stop plate) the space between is enlarged so that the ear of corn, cleared from the husks, drops off the plate, and under the machine, or into a suitable receptacle placed beneath. Before however the ear is husked it is brought under the action of knives to have its stalk cut off, as follows: Upon being placed on the plate F, it is so placed that its stalk end shall project beyond the end of the plate, and over a stationary knife H, fastened to the frame in the position as seen in Figs. 3, and 4, (the latter figure showing the position of the husking cylinder, when the depression *c d e* is brought opposite to the stop plate). Another knife L, is fastened upon the end of the husking cylinder, as seen in Figs. 3 and 4, and as the cylinder is revolved, the cutting edge of this knife will operate with the edge of the knife H, upon the projecting head of the ear of corn, and with a drawing or scissors motion, will sever the stalk, and the attached ends of the husk, from the ear. The ear is next brought under the action of the hooks, the husks then having no attachment except their adhesion to the sides of the corn, and so that the office of the hooks is, not to tear the roots of the husks off, but to unfold or pull away the severed husks. After being thus dislodged, the most of them cling onto the hooks, and to clear the cylinder from them, I make use of a clearing cylinder L, which I will now describe. Said cylinder is placed upon a shaft N, revolving in bearings *r, r*, in a path parallel to the cylinder C. Upon and around this cylinder I arrange several series of projecting teeth or pins *a, a, a*, extending from its circumference far enough to bring them when the cylinder is revolved, close to the circumference of the cylinder C, and so that they shall pass between the hooks b, b.

A cogged pinion M, is placed upon one end of the shaft N, of the clearing cylinder, said sector being made to mesh into, and receive motion from a cog wheel O, placed upon the corresponding end of the husking cylinder C. As motion is given to the cylinder C, motion in the opposite direction will be imported to the clearing cylinder, with such speed that the pins o, o, coming into contact with the husks on the hooks b, b, pull them from off the hooks, and throw them under the machine leaving the cylinder and hooks entirely freed from husks, and ready to operate on the next ear of corn to be husked. Thus it will be seen that the operation of my machine is to first cut the stalk and attached ends of the husks from the ear, next to remove the several husks from their contact with the ear and then to free itself from the husk, the whole being performed at one revolution, and as many ears being husked as revolutions can be given, and ears be fed to the machine.

The machine is simple and effective, cheap, and not liable to get out of order.

What I claim as my invention is as follows:

1. I claim the use of the hooks b, b, or their mechanical equivalents, arranged and made to operate essentially as described in connection with two knives, I, K, for the purpose of cutting off the stalk of an ear of corn, and removing the husks therefrom.

2. I also claim making the cylinder C, with the depression c, d, e, for the purpose as described.

In testimony whereof I have hereto set my signature, this eighth day of September, A. D. 1856.

HARLAN P. GERRISH.

Witnesses:
 FRANKLIN C. MORRILL,
 DANIEL D. WEBSTER.